US007933807B2

(12) United States Patent
Cue et al.

(10) Patent No.: US 7,933,807 B2
(45) Date of Patent: Apr. 26, 2011

(54) STORED ORDER SYSTEM FOR ELECTRONIC COMMERCE

(75) Inventors: Eduardo Cue, Mountain view, CA (US); Daniel Marusich, San Carlos, CA (US); Glenn D. Epis, Sunnyvale, CA (US); Judy D. Halchin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 896 days.

(21) Appl. No.: 11/898,337

(22) Filed: Sep. 11, 2007

(65) Prior Publication Data

US 2008/0004988 A1 Jan. 3, 2008

Related U.S. Application Data

(63) Continuation of application No. 09/607,913, filed on Jun. 30, 2000, now Pat. No. 7,275,041.

(51) Int. Cl.
*G06Q 30/00* (2006.01)
(52) U.S. Cl. ............................................. 705/26; 705/37
(58) Field of Classification Search .................... 705/26, 705/37
See application file for complete search history.

(56) References Cited

U.S. PATENT DOCUMENTS

| 5,671,279 | A |   | 9/1997  | Elgamal         |         |
|-----------|---|---|---------|-----------------|---------|
| 5,870,473 | A |   | 2/1999  | Boesch et al.   |         |
| 5,897,622 | A |   | 4/1999  | Blinn et al.    |         |
| 5,914,472 | A | * | 6/1999  | Foladare et al. | 235/380 |
| 5,953,710 | A | * | 9/1999  | Fleming         | 705/38  |
| 5,970,475 | A | * | 10/1999 | Barnes et al.   | 705/27  |
| 5,991,740 | A |   | 11/1999 | Messer          |         |
| 6,061,057 | A |   | 5/2000  | Knowlton et al. |         |
| 6,101,485 | A |   | 8/2000  | Fortenberry et al. | |
| 6,167,383 | A |   | 12/2000 | Henson          |         |
| 6,321,211 | B1|   | 11/2001 | Dodd            |         |
| 6,336,137 | B1|   | 1/2002  | Lee et al.      |         |
| 6,633,849 | B1|   | 10/2003 | Dodd            |         |
| 6,850,899 | B1|   | 2/2005  | Chow et al.     |         |
| 7,720,712 | B1| * | 5/2010  | Allocca et al.  | 705/26  |

FOREIGN PATENT DOCUMENTS

WO    WO 01/71578    9/2001

OTHER PUBLICATIONS

Lawrence J. Magid, "Personal Technology; Big Mac on Campus? Or a PC?"; [Home Edition], Los Angeles Times. Los Angeles, Calif.: Aug. 25, 1997, downloaded from the Internet on Apr. 29, 2007, 3 pages.
Catherine Greenman, "Will Gift Lists Click?", New York Times; New York; Nov. 18, 1999, and associated Waybackmachine screen captures of the Della.com web site content of Mar. 4, 2000, 5 pages.
Tim Jackson, "All to play for in the US toy market: In less than two years eToys has gained a lead that would-be competitors will find hard to make up"; Financial Times; London; May 25, 1999, 3 pages.
Frances Katz, "E-lists help in making gift wishes come true", Times Union; Albany; Dec. 15, 1999, 2 pages.

* cited by examiner

*Primary Examiner* — James ZUrita
(74) *Attorney, Agent, or Firm* — Buchanan Ingersoll & Rooney PC

(57) ABSTRACT

A stored order system is used with a shopping cart application for an electronic commerce site. The items of each stored order are saved together, which is an advantage when a main item and accessories are combined in an order. Additionally, a stored order can be E-mailed to another person. The E-mail message allows the recipient to purchase the items of the stored order.

4 Claims, 15 Drawing Sheets http://Store.apple.com / ... / APPLE STORE 7 SAVED ORDERNUMBER = 735003 & lastName = o'malley

FIGURE 4B

From: <confirmation@apple.com>
To: <josepho@burnsdoane.com>
Date: 5/25/00 10:43AM
Subject: Order items saved by joseph o'malley A message from joseph o'malley,

[empty message]

---

The following items have been saved for your reference on the Apple Store.
Click the link below to go directly to the Apple Store and view these items.

http://store.apple.com/1-800-MY-APPLE/WebObjects/AppleStore?savedOrderNumber=735003&lastName=o'malley

---

DATE SAVED: 05/25/00 - 10:40 AM Pacific Standard Time

SAVED ITEMS:

Part Number: Z01R
    Product Name: iMac 400MHz DV Special Edition
    Options:
       065-2042   128MB SDRAM - 1 DIMM
       065-1945   Accessory kit
       065-2066   Graphite
    Unit Price: $1,499.00
    Quantity: 1
    Net Price: $1,499.00

Part Number: T2469LL/A
    Product Name: Quake III - Activision
    Unit Price: $49.00
    Quantity: 1
    Net Price: $49.00

Part Number: T2224LL/A
    Product Name: Iomega USB Zip Drive
    Unit Price: $99.00
    Quantity: 1
    Net Price: $99.00

SUBTOTAL: $1,647.00

Total does not include any applicable sales tax or any express shipping charges.

Review saved orders.

● Click on an order number below to view saved order in detail.

Or

● Click on the Continue button to purchase saved items.

| Order Number | Date Saved | Subtotal |
|---|---|---|
| W734242 | May 25, 2000 | $1,599.00 |
| W734989 | May 25, 2000 | $1,779.00 |
| W735003 | May 25, 2000 | $1,647.00 |

You can also order from The Apple Store by calling 1-800-MY-APPLE.
Copyright © 2000 Apple Computer, Inc. All rights reserved.
See Sales and Refunds Policy for more information.

STORED ORDER SYSTEM FOR ELECTRONIC COMMERCE

CROSS REFERENCE TO RELATED APPLICATION

This application is a Continuation Application of application Ser. No. 09/607,913, filed Jun. 30, 2000 now U.S. Pat. No. 7,275,041.

BACKGROUND OF THE INVENTION

The present invention relates to electronic commerce systems, especially systems that receive orders over the Internet.

With the expansion of the Internet, electronic commerce has become quite popular. Typically, at electronic commerce sites, a number of goods can be selected by a user and added to a "shopping cart" which stores the selected items for purchase by the user. When the user is finished selecting items for purchase, the user can purchase the items, typically using a credit card.

Typically, the item can be saved in the user's shopping cart for later purchase. When the user returns to the electronic commerce site, the saved items remain in the shopping cart, available for purchase. The user is identified by some combination of cookies stored in the user's computer, and passwords.

It is desired to have an improved method and apparatus for storing items for later purchase at an electronic commerce site.

SUMMARY OF THE PRESENT INVENTION

One exemplary embodiment of the present invention comprises an electronic commerce system that allows the user to E-mail stored orders to other people for purchase. One embodiment comprises a method of receiving order selections from a first user, saving stored order data, the stored order data including the order selections, and, in response to a first user request, automatically producing and sending an electronic mail message concerning the stored order to a recipient, the electronic mail message identifying the stored order and allowing the recipient to purchase the stored order.

This embodiment allows-people to recommend items for purchase by another. This embodiment is especially useful for electronic commerce sites that allow for the purchase of relatively complex systems, such as computer systems. Typically, computer systems need to be configured. In one embodiment of the present invention, a knowledgeable person configures an order and E-mails it to another person for purchase. Additionally, since computer systems are relatively expensive, a student could configure a computer order and E-mail it to his or her parents, allowing the parents to purchase the computer system.

Another exemplary embodiment of the present invention is a system in which a whole order, including at least one main item and at least one accessory, is stored together, so that later, when the user comes back to purchase the item, the user can easily select a stored order including a main item and an accessory. This embodiment offers an advantage over systems which store each item separately.

One example of this embodiment comprises a method of receiving first order selections from a user, the order selections including at least one main item and at least one accessory for the main item, saving first stored order data, the first stored order data including the first order selections, receiving second order selections from the user, saving second order data, the second stored order data including the second order selections, and thereafter, in response to a request from the user, providing a display of the unpurchased first and second stored orders, the display allowing the user to select the first or the second order for review.

This embodiment has a number of advantages when used with electronic commerce sites that sell systems having a number of options and/or components. Bundling the items of the stored order together is more convenient for the potential purchaser of such a relatively complex system.

BRIEF DESCRIPTION OF THE FIGURES

FIGS. 4A-4E are screen shots that illustrate the operation of one embodiment of the present invention.

FIGS. 8A-8E are screen shots that illustrate the operation of the stored order system of the present invention.

DETAILED DESCRIPTION OF THE PREFERRED EMBODIMENT

Figure 1:
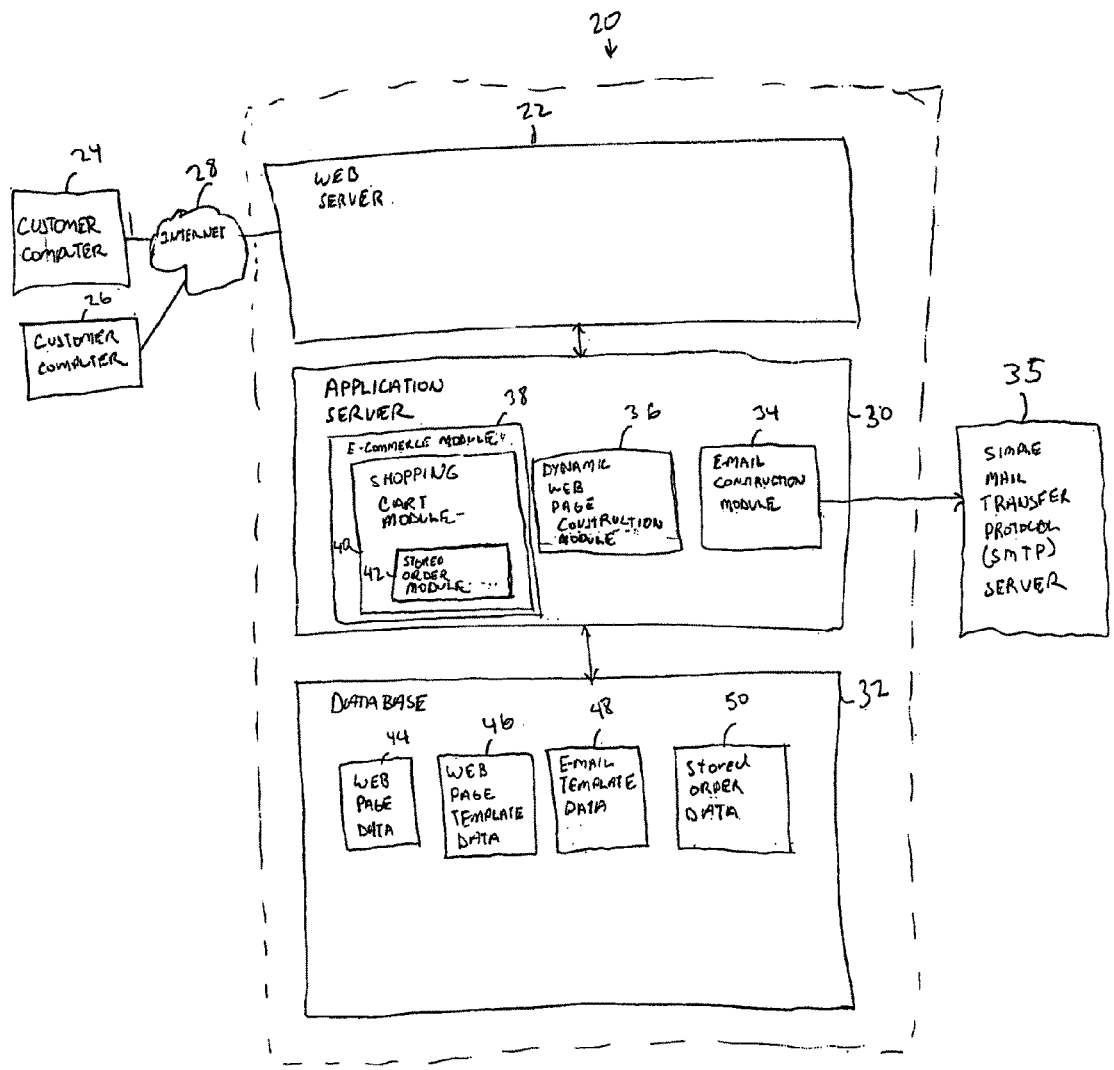
FIG. 1 is a diagram of a server system implementing one embodiment of the present invention.

FIG. 1 shows a server system 20 which can be used to implement the present invention. Server system 20 includes a web server 22 which receives requests from customer computers 24 and 26 over the Internet 28. The web server 22 interacts with an application server 30 which runs applications used at a web site. This application server interacts with a database 32 storing the data required by the applications. The application server in this instance includes an E-mail construction module 34, a dynamic web page construction module 36, and an E-commerce module 38. The E-commerce module 38 includes a shopping cart module 40 which includes the stored order module 42 of the present invention.

As will be described below, in one embodiment, the stored order module 42 interfaces with the E-mail construction module 34 to produce an E-mail message of the stored order to send to another person. Additionally, in one embodiment, the stored order module arranges a display of stored orders rather than listing each item separately.

The database 32 stores data for the application server. In one embodiment, the data includes web page data 44, web page template data 46, E-mail template data 48 and stored order data 50. The dynamic web page construction module 36 allows for the dynamic construction of web pages for a customer based upon query terms in the Uniform Resource Locator (URL) or other information provided by a customer. The web page data 44 and the web page template data 46 can be used in the construction of such dynamically-created web pages. The E-mail construction module 34, as will be described below, also uses data stored in the database 32 to construct the E-mails sent to the second user for purchase of a stored order. The E-mail construction module 34 sends the constructed E-mails to a simple mail transfer protocol (SMTP) server 35. In particular, stored order 50 is used in the dynamic construction of both web pages and the E-mail to the second user.

Figure 2:
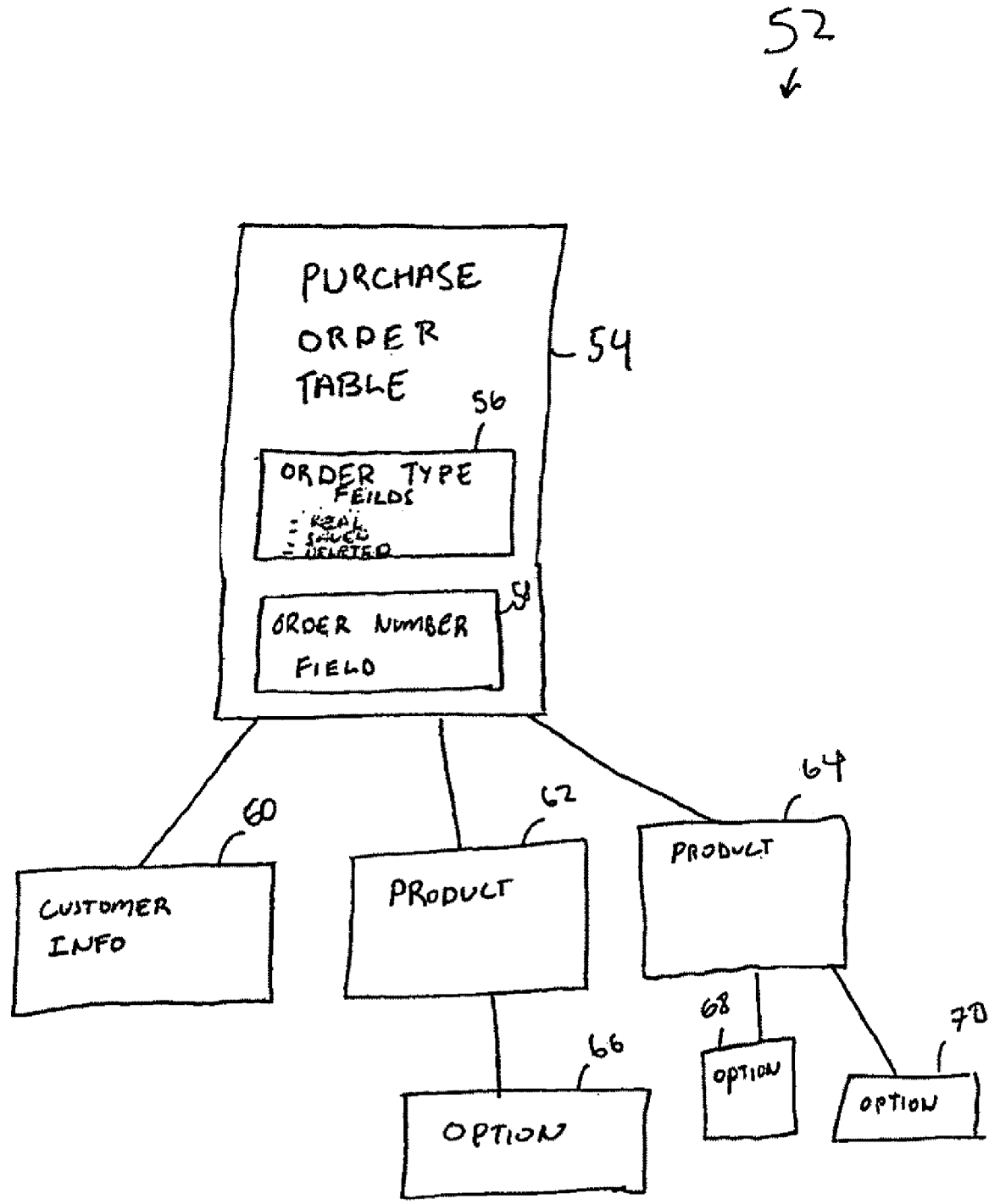
FIG. 2 is a diagram of a data structure used for the saved orders in one embodiment of the present invention.

FIG. 2 shows one example of a data structure 52 for stored order data. Purchase order table 54 includes order-type fields 56. These include fields that allow the indication of whether the order is a real order that needs to be processed for shipping, a "stored" order described below, and/or a deleted order. In one embodiment, separate fields are used for each type so that a user could delete an order already E-mailed to the second user, and the second person can still produce a display of this saved order even though it has been deleted for the first user. The purchase order table also includes an order number field 58 which allows the unique specification of an identifying order number. The purchase order is associated with customer information 60 which can include the shipping, billing, mailing address, credit card information if obtained, E-mail address and encrypted password information. Also the purchase order includes a number of products 62 and 64 and associated options 66, 68 and 70. The product information can include a description of the product, cost of the product, and other information. At the time of purchase, the total cost of the order can be dynamically determined. Note that having a single data structure for purchase order including the saved order simplifies the operation of the system.

Figure 3:
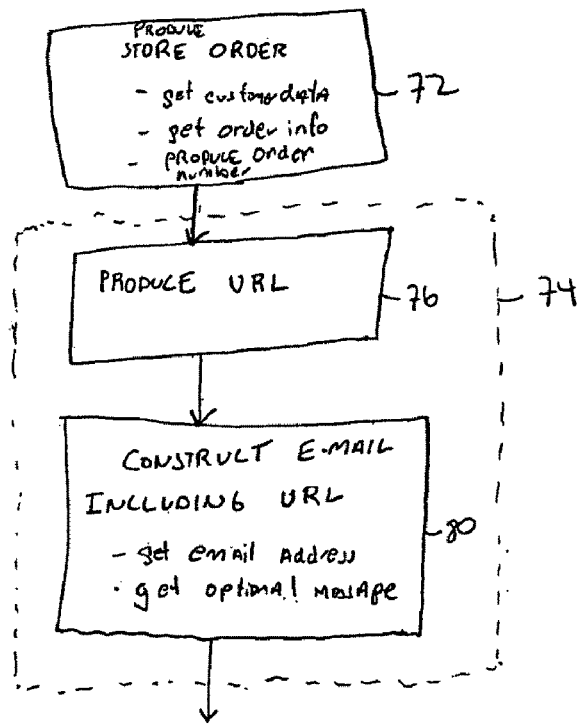
FIG. 3 is a flow chart that illustrates the operation of one embodiment of the present invention.
Figure 3:
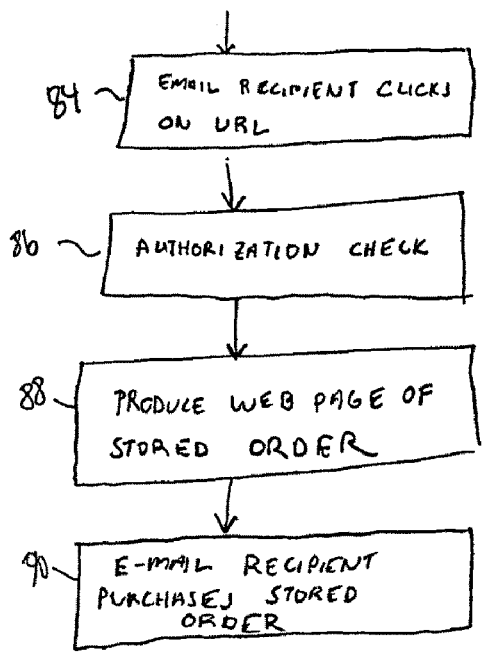

FIG. 3 is a flow chart that illustrates the operation of E-mailing a stored order to a third party. In step 72, a stored order is produced. The customer data is received by inputs at a web page. Order information is produced by selections made by the first user at an E-commerce store site. A unique order number is also produced. In step 74, an E-mail of the stored order is produced. In step 76, a URL indicating the stored order is produced. In one embodiment, this URL, such as URL 82, includes the unique order number to uniquely identify the stored order. An electronic mail message including the URL is constructed in step 80. This step preferably includes obtaining an E-mail address from the user as well as getting an optional message. The E-mail message is transferred to the second user at the destination E-mail address. This E-mail message preferably includes a URL which can be clicked on by the recipient. URL 82 is an example of such a URL. The URL includes a question mark (?) which delineates the query string from the location being queried by the string. In step 84, the E-mail recipient clicks on the URL. In optional step 86, an authorization check is done on the query string. In this example, if the last name string is not matched with a saved order number, no web page is provided to the second user. Assuming that the authorization check is correct, in step 88, a web page of the stored order is produced. In one embodiment, the query terms are used by the application server to dynamically create a web page that indicates the stored order. In step 90, the E-mail recipient can purchase the stored order from the web page.

Figure 4A:
Figure 4B:
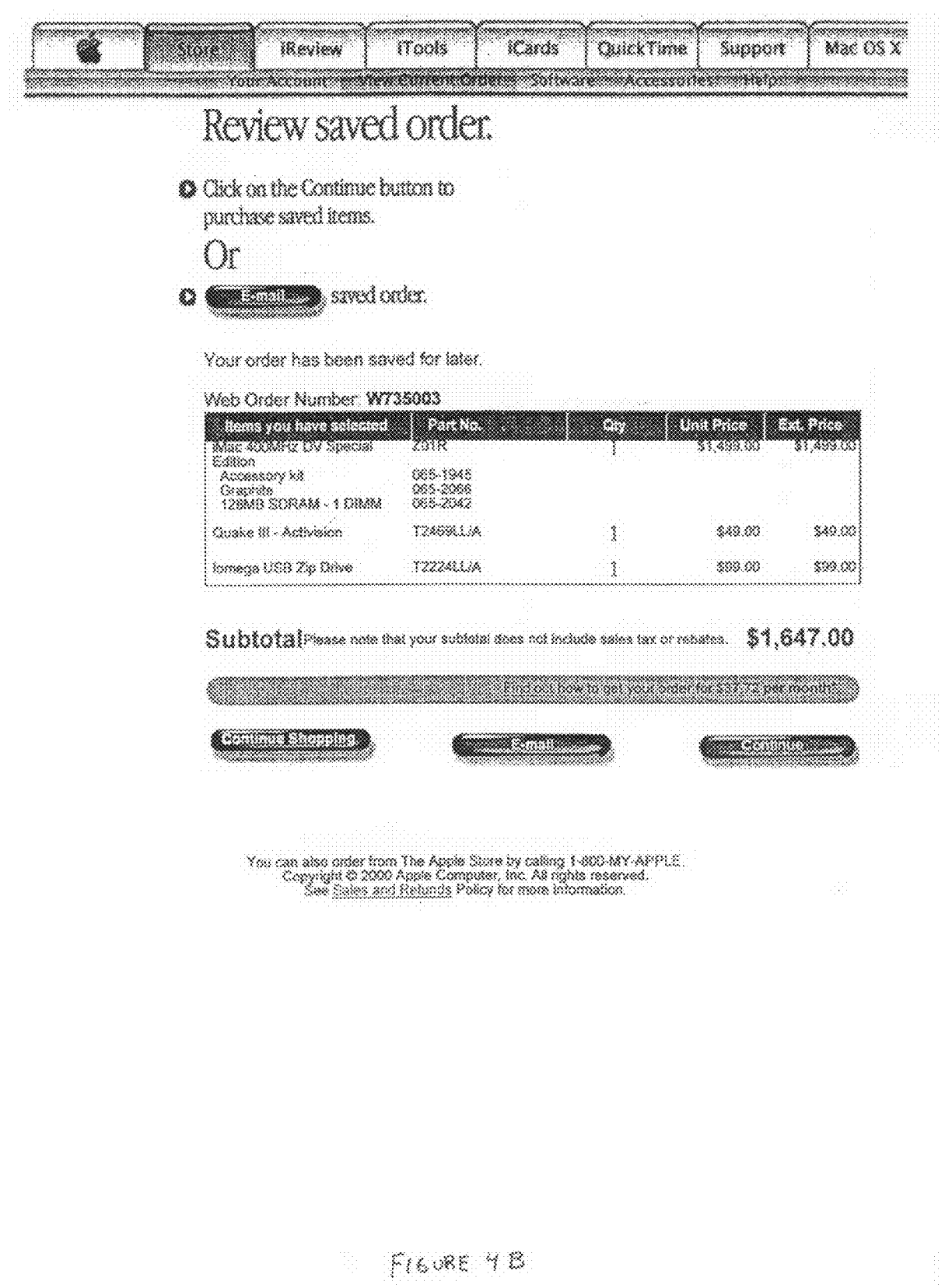
Figure 4C:
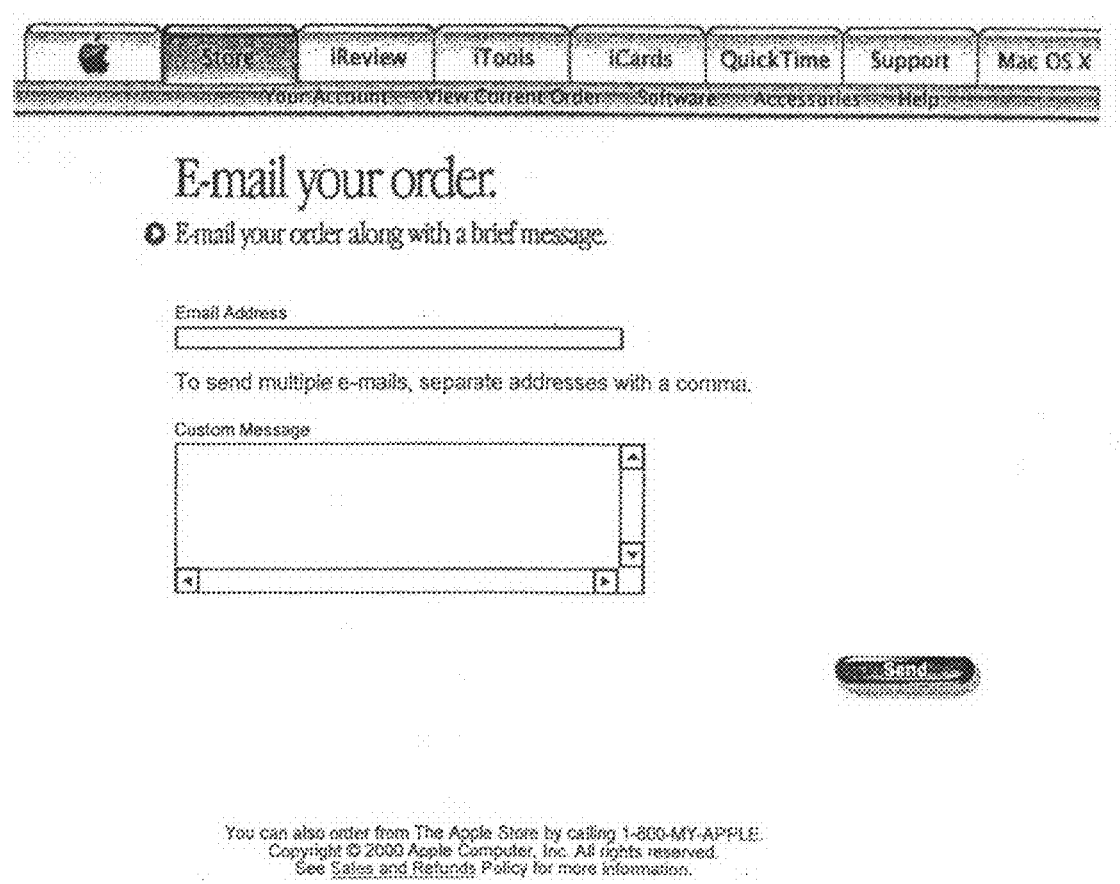
Figure 4E:

FIGS. 4A-4E are screen shots that indicate one embodiment of the system of the present invention. FIG. 4A is a display of a front page of an electronic commerce store. Data provided by the web browser on the user's computer can be used by the application server to produce a personalized web page that indicates the saved orders for a person. Otherwise a saved order can be created by clicking through the web site, selecting the items to purchase. FIG. 4B illustrates a saved order review page which can be accessed by clicking a saved order button on the main page, shown in FIG. 4A. The review saved order page allows the user to select an E-mail button to E-mail the saved order to a third person. When the E-mail button is selected, a page (shown in FIG. 4C) is created, which allows for the input of a destination E-mail address, along with an optional message to send to a recipient. Once the data is input, by clicking the send button, this data is provided to the application server which uses this data along with the saved order data to construct an E-mail message to be sent to the E-mail recipient. FIG. 4D illustrates a sample of an E-mail message, including a URL which can be clicked on by the user to produce a display of the saved order. In many user computer systems, clicking on a URL in an E-mail message accesses the web browser. The web browser sends the URL out to the server system that produces a display of the saved order. In this example, the E-mail message includes an indication of the creator of the saved order, an optional message from the creator, as well as an indication of the saved items in the order. Once the user clicks on the URL, a web page, such as the web page shown in FIG. 4E, is produced, which allows the recipient to purchase the items selected by the first user.

The E-mail system of the present invention has the advantage that it allows a knowledgeable user to select the components for a computer system for purchase by a second person. It also allows a student to select a computer system for purchase by the student's parents. The recipient of the E-mail message can modify the order before purchase. Standard checkout procedures are used to purchase an order.

Figure 5:
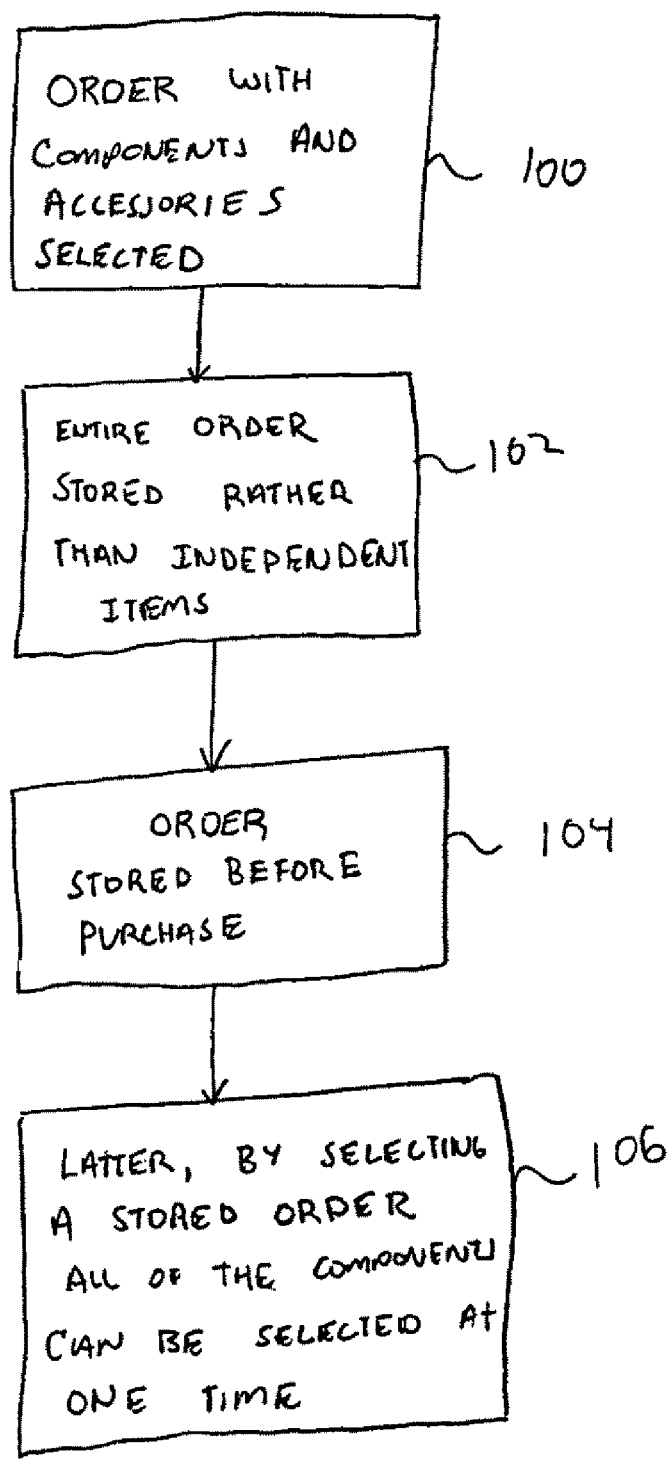
FIG. 5 is a flow chart that illustrates an embodiment of the present invention concerning stored orders.

FIG. 5 is a diagram that illustrates one embodiment of the present invention. In step 100, an order for components and accessories is selected. In step 102, the entire order is stored rather than the independent items. In step 104, the stored order is saved at the server system to allow the user to return later and purchase the items in the stored order. In step 106, later by selecting the stored order all the components can be selected for display at the same time.

Figure 6:
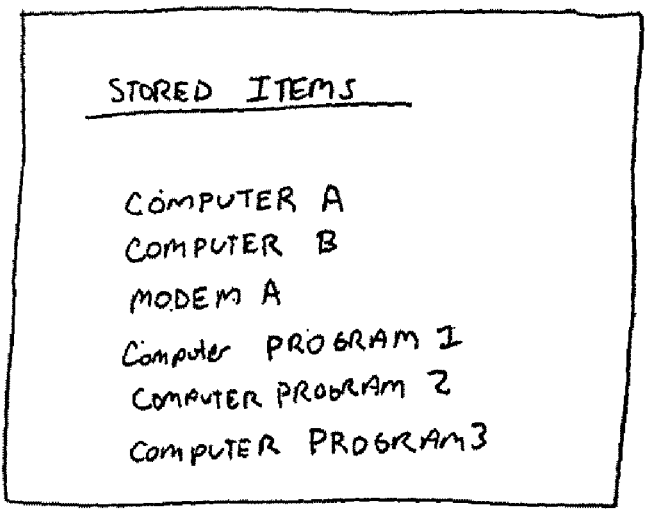
FIG. 6 is a diagram that illustrates a conventional display of stored items.
Figure 7:
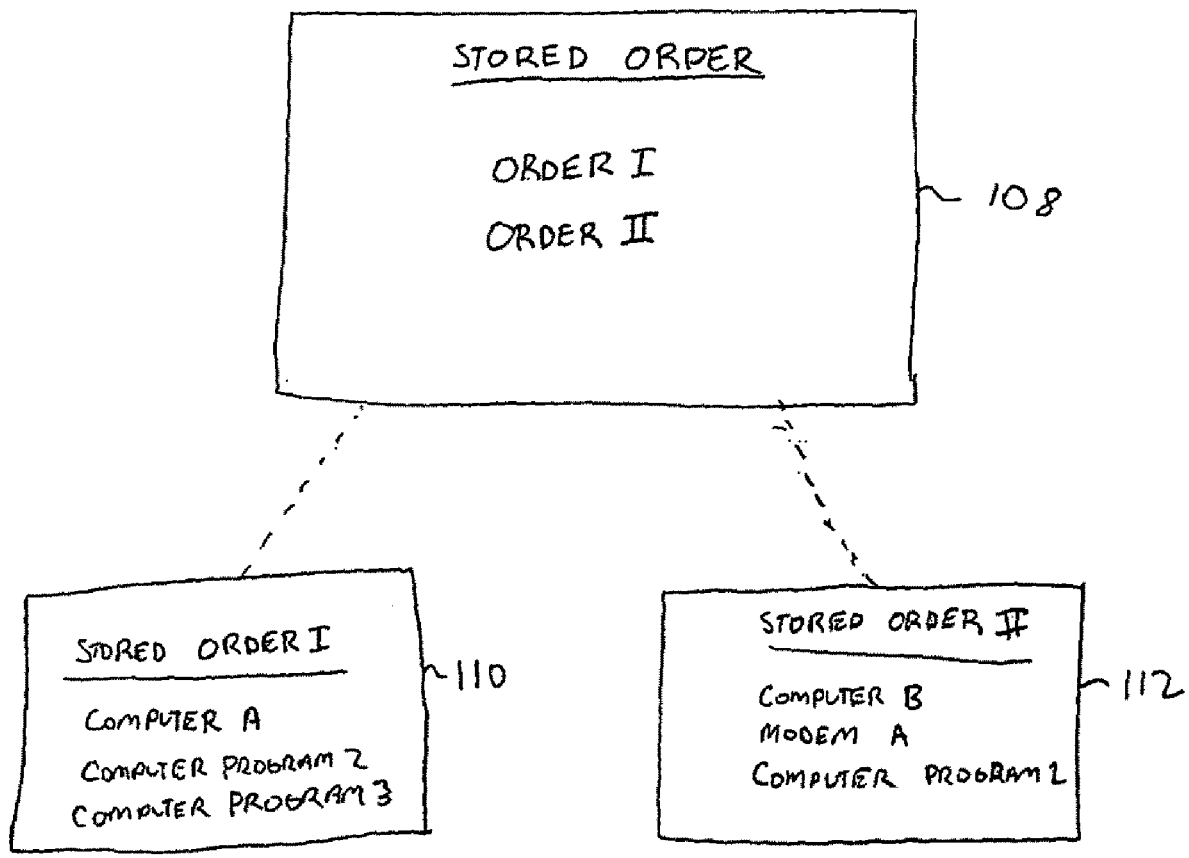
FIG. 7 is a diagram that illustrates the display of stored orders of one embodiment of the present invention.
Figure 5A:
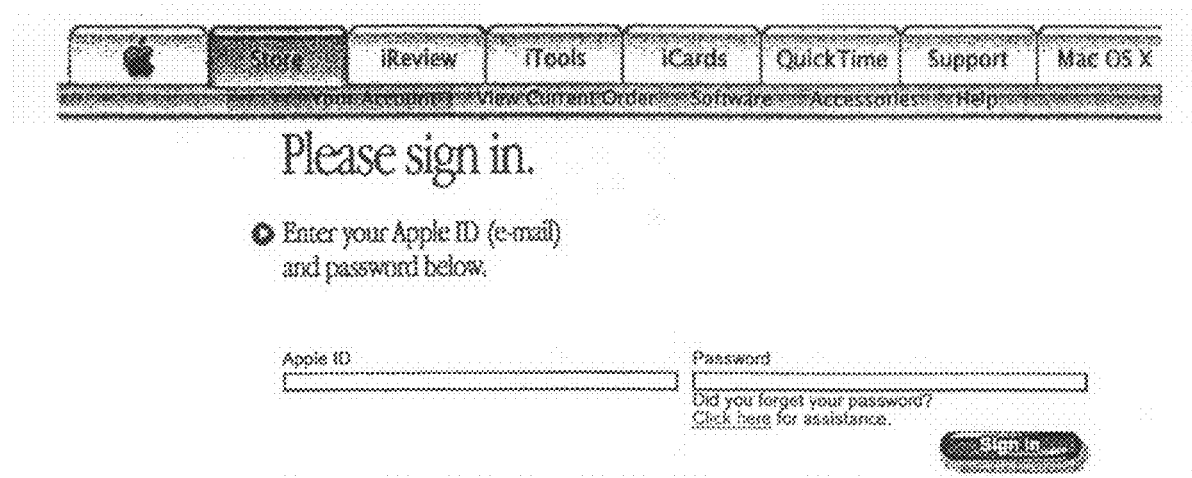

FIGS. 6 and 7 illustrate an advantage of the present invention. FIG. 6 illustrates a display of stored items produced by a conventional saved-item system. In this display, each of the items is shown separately for selection and purchase. This means if a main item with accessories is stored along with another order, later on these main items and accessories must be reselected to be purchased as a group.

FIG. 7 illustrates a server system in which a display 108 allows the user to select different stored orders. Stored order I includes a main item (the computer A) with a number of accessories (computer program 2 and computer program 3). Stored order II includes a main item (computer B) along with accessories (modem A and computer program 1). Storing and displaying the orders together in this manner is an advantage when the items in an order are logically related, such as a main item and accessories. The accessories to be selected can include components and items such as computer programs which are used for the main item.

Note that, as shown in FIG. 2, the accessories need not be options but can be separate products. For example, a computer and computer program are usually separate products for the data structure of FIG. 2.

Figure 8B:
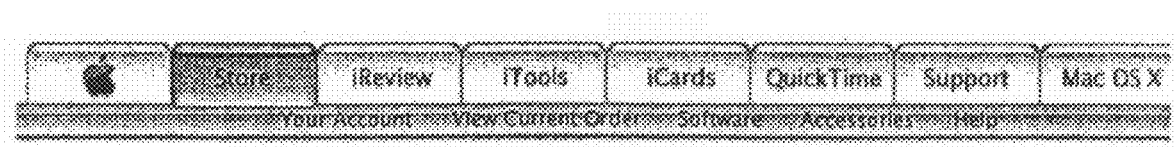
Figure 8B:
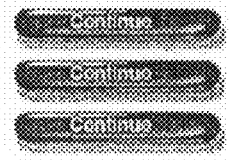
Figure 8B:
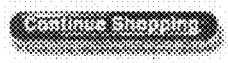
Figure 8C:
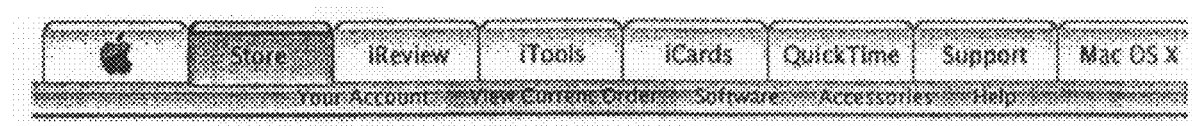
Figure 8C:
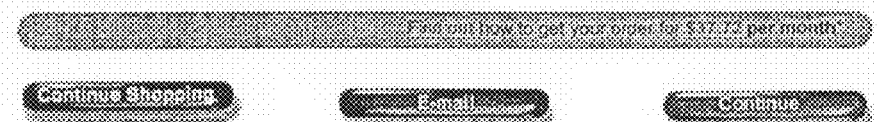
Figure 8D:
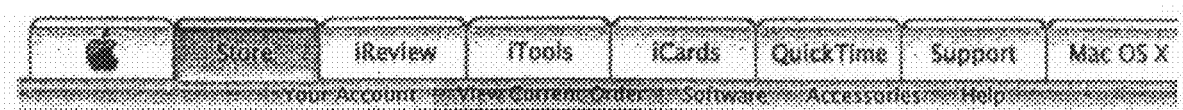
Figure 8D:
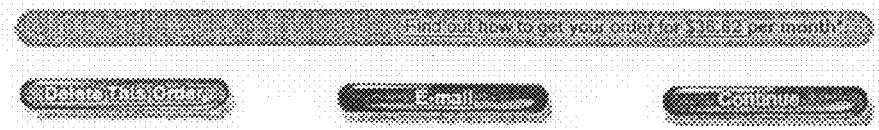
Figure 8E:
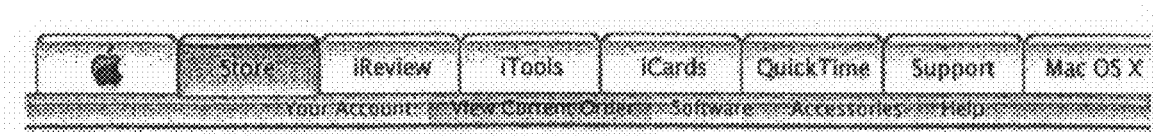
Figure 8E:

FIGS. 8A-8E illustrate one embodiment of the stored item system. In FIG. 8A, the user signs in at a web site. In FIG. 8B, once the user signs in, the user has access to the saved orders. The user can click on any of the stored orders to purchased these saved orders. Optionally, additional description information can be provided at the web page of FIG. 8B. FIGS. 8C, 8D and 8E illustrate three different saved orders. Note that the items of the stored orders are not mixed together but each accessory is associated with the correct main item.

It will be appreciated by those of ordinary skill in the art that the invention can be implemented in other specific forms without departing from the spirit or character thereof. For example, a server system can be arranged in a different manner, possibly with different elements, than that shown in FIG.

1 with elements located in one or multiple locations. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method for conducting online commerce transactions over a computer network, comprising the following steps:

generating a display of an electronic commerce site illustrating multiple products that can be selected for purchase;

receiving from a consumer, via said network, a selection of a plurality of said products to be purchased, and an identification of a party to be notified of said selection;

storing an order comprising said plurality of products;

sending a notification via said network to the identified party containing a resource for accessing the stored order;

in response to a request from the identified party received via said network, generating a display that identifies each of the plurality of products that constitute said stored order;

in response to a further request from the identified party via said network, completing the sale of the plurality of products in the stored order to the identified party as a single transaction.

2. A computer-readable medium encoded with a program which, when executed by a computer, causes the computer to perform the following operations:

generating a display of an electronic commerce site illustrating multiple products that can be selected for purchase;

receiving from a consumer a selection of a plurality of said products to be purchased, and an identification of a party to be notified of said selection;

storing an order comprising said plurality of products;

sending a notification to the identified party containing a resource for accessing the stored order;

in response to a request from the identified party, generating a display that identifies each of the plurality of products that constitute said stored order;

in response to a further request from the identified party, completing the sale of the plurality of products in the stored order to the identified party as a single transaction.

3. An electronic commerce server system, comprising:

an application server that generates a display of an electronic commerce site illustrating multiple products that can be selected for purchase;

a communications interface that receives a selection of a plurality of said products to be purchased, and an identification of a party to be notified; and a database that stores information regarding the multiple products illustrated at said electronic commerce site, and stores an order comprising said plurality of selected products;

wherein said application server is responsive to receipt of said selection and identification to cause said communications interface to send a notification to the identified party containing a resource for accessing the stored order, and is responsive to first request from the identified party to generate a display that identifies each of the plurality of products that constitute the stored order, and is responsive to a second request from the identified party to complete the sale of the plurality of products in the stored order to the identified party as a single transaction.

4. The system of claim 3, wherein said database stores a plurality of orders each comprising a plurality of products, and wherein said application server is responsive to said first request to enable said identified party to select one of the plurality of stored orders, and thereafter generate a display of the plurality of products in the selected order.

* * * * *

UNITED STATES PATENT AND TRADEMARK OFFICE
CERTIFICATE OF CORRECTION

PATENT NO. : 7,933,807 B2  Page 1 of 1
APPLICATION NO. : 11/898337
DATED : April 26, 2011
INVENTOR(S) : Eduardo Cue et al.

It is certified that error appears in the above-identified patent and that said Letters Patent is hereby corrected as shown below:

On the Title Page, in Primary Examiner, in column 2, line 1, delete "ZUrita" and insert -- Zurita --, therefor.

Signed and Sealed this
Sixth Day of December, 2011

David J. Kappos
*Director of the United States Patent and Trademark Office*